United States Patent
Boyce

(10) Patent No.: US 10,887,572 B2
(45) Date of Patent: Jan. 5, 2021

(54) SUGGESTED VIEWPORT INDICATION FOR PANORAMIC VIDEO

(71) Applicant: Intel Corporation, Santa Clara, CA (US)

(72) Inventor: Jill M. Boyce, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/341,394

(22) PCT Filed: Nov. 15, 2017

(86) PCT No.: PCT/US2017/061731
§ 371 (c)(1),
(2) Date: Apr. 11, 2019

(87) PCT Pub. No.: WO2018/093851
PCT Pub. Date: May 24, 2018

(65) Prior Publication Data
US 2020/0045286 A1 Feb. 6, 2020

Related U.S. Application Data

(60) Provisional application No. 62/423,343, filed on Nov. 17, 2016.

(51) Int. Cl.
*G09G 3/18* (2006.01)
*H04N 13/117* (2018.01)
(Continued)

(52) U.S. Cl.
CPC .......... *H04N 13/117* (2018.05); *G06F 3/011* (2013.01); *G06F 3/012* (2013.01); *G06F 3/014* (2013.01);
(Continued)

(58) Field of Classification Search
CPC .......... G06F 3/011; G06F 3/012; G06F 3/014; G06F 16/583; G06F 16/5866; G09G 2352/00
See application file for complete search history.

(56) References Cited

U.S. PATENT DOCUMENTS 8,743,219 B1 6/2014 Bledsoe
9,277,122 B1 3/2016 Imura et al.
(Continued)

FOREIGN PATENT DOCUMENTS

CN 1491403 4/2004
CN 106060515 10/2016
(Continued)

OTHER PUBLICATIONS

International Search Report and Written Opinion for PCT Application No. PCT/US17/61714, dated Feb. 8, 2018.
(Continued)

*Primary Examiner* — Vijay Shankar
(74) *Attorney, Agent, or Firm* — Hanley, Flight & Zimmerman, LLC

(57) ABSTRACT

A suggested viewport indication is generated and sent for use in a panoramic video. In one example, a method includes receiving encoded video including viewport metadata, decoding the video, extracting the viewport metadata, generating a viewport of the decoded video based on the viewport metadata, and buffering the generated viewport for display.

19 Claims, 9 Drawing Sheets

(51) Int. Cl.
*H04N 13/178* (2018.01)
*H04N 13/161* (2018.01)
*G06F 3/01* (2006.01)

(52) U.S. Cl.
CPC ......... *H04N 13/161* (2018.05); *H04N 13/178* (2018.05)

(56) References Cited

U.S. PATENT DOCUMENTS

| | | | |
|---|---|---|---|
| 9,497,457 | B1 | 11/2016 | Gupta |
| 10,375,375 | B2* | 8/2019 | Hwang ................ H04N 13/178 |
| 10,560,660 | B2* | 2/2020 | Boyce .................... H04N 19/70 |
| 2009/0110372 | A1 | 4/2009 | Morioka et al. |
| 2009/0129636 | A1 | 5/2009 | Mei et al. |
| 2010/0001997 | A1 | 1/2010 | Kajikawa et al. |
| 2010/0214484 | A1 | 8/2010 | Weaver |
| 2012/0092348 | A1 | 4/2012 | McCutchen |
| 2013/0176384 | A1 | 7/2013 | Jones et al. |
| 2015/0249815 | A1 | 9/2015 | Sandrew et al. |
| 2016/0012855 | A1 | 1/2016 | Krishnan |
| 2016/0086379 | A1 | 3/2016 | Sadi et al. |
| 2016/0165309 | A1 | 6/2016 | Van Brandenburg et al. |
| 2016/0227255 | A1 | 8/2016 | Wang et al. |
| 2017/0026659 | A1 | 1/2017 | Lin et al. |
| 2018/0374192 | A1* | 12/2018 | Kunkel ................ G06T 15/205 |
| 2019/0251660 | A1 | 8/2019 | Lin et al. |
| 2020/0014905 | A1* | 1/2020 | Oh ....................... H04N 13/139 |
| 2020/0014907 | A1* | 1/2020 | Lee ......................... H04N 21/00 |
| 2020/0021791 | A1* | 1/2020 | Hur .................. H04N 21/26258 |
| 2020/0084428 | A1* | 3/2020 | Oh ....................... H04N 13/194 |

FOREIGN PATENT DOCUMENTS

| | | |
|---|---|---|
| EP | 2490179 | 8/2012 |
| WO | 2012121744 | 9/2012 |
| WO | 2016010668 | 1/2016 |

OTHER PUBLICATIONS

International Search Report and Written Opinion for PCT Application No. PCT/US17/61731, dated Mar. 19, 2018.
International Preliminary Report on Patentability for PCT Application No. PCT/US17/61731, dated May 31, 2019.
International Preliminary Report on Patentability for PCT Application No. PCT/US17/61714, dated May 31, 2019.
European Search Report for European Patent Application No. 17870859.0, dated Jun. 8, 2020.
European Search Report for European Patent Application No. 17871202.2, dated May 8, 2020.
Non-Final Office Action for U.S. Appl. No. 16/341,392, dated Mar. 24, 2020.
Boyce, J. et al., "SEI message for display orientation information", JCT-VC Meeting; retrieved from the Internet at http://phenix.int-evry.fr/jct/doc_end_user/documents/7_Geneva/wg11/JCTVC-G079-v2.zip Nov. 24, 2011.
Hanhart, P. et al., "AHG8: High level syntax 10, 11 extensions for signaling of 360 degree vidoe information", JVET Meeting; Oct. 6, 2016.
Thomas, E. et al., "Projection-independent ROI signalling for spherical content (OMAF)", Motion Picture Expert Group (MPEG) Meeting, Chengdu, Oct. 12, 2016.
The State Intellectual Property Office of People's Republic of China, "First Office Action," issued in connection with application No. 201780067678.3, dated Nov. 2, 2020, 20 pages. (English translation provided).

* cited by examiner

| 2 | /// | /// | /// |
|---|---|---|---|
| 1 | 4 | 0 | 5 |
| 3 | /// | /// | /// |

| 4 | 0 | 5 |
|---|---|---|
| 2 | 1 | 3 |

SUGGESTED VIEWPORT INDICATION FOR PANORAMIC VIDEO

CROSS-REFERENCE TO RELATED APPLICATIONS

The present application is a National Stage Entry of, and claims priority to, PCT Application Serial No. PCT/US2017/061731 filed Nov. 15, 2017 entitled "SUGGESTED VIEWPORT INDICATION FOR PANORAMIC VIDEO which claims priority to U.S. Provisional Application Ser. No. 62/423,343 filed Nov. 17, 2016 entitled SUGGESTED VIEWPORT INDICATION FOR PANORAMIC VIDEO, the disclosure of which are incorporated by reference in their entireties for all purposes.

FIELD

The present description relates to communication of encoded video, and in particular to communicating a suggested viewport with the video.

BACKGROUND

With the emergence of low cost high definition video cameras and high-speed internet connectivity, video internet traffic is growing quickly. 360-degree video is an emerging trend in virtual reality, video conferencing, automotive, and surveillance applications, among others and is supported by wide field of view cameras, including 180 and 360-degree field of view cameras. Dedicated web sites and channels are also available to post and view 360-degree videos, including virtual reality content. For collaboration between groups of users, 360-degree video offers greater flexibility. Instead of switching between cameras, a remote viewer can move across a room using a 360-degree view and zoom in on people or objects of interest in the camera's view.

Panoramic video playback systems using Virtual Reality (VR) head mounted displays are emerging for consumer use. Panoramic and 360-degree video content is typically created by stitching together the 2D videos captured by multiple cameras into a spherical representation. In some cases, the multiple views are rendered in software. The spherical video is then projected into a format suited for video encoding, such as an equi-rectangular projection format or a cube map projection format.

At the client, the bitstream containing the full panoramic compressed video frames is received and decoded, creating a representation of the entire panoramic field of view. A smaller viewport is selected for display. The portion of decoded video represented by the viewport is determined by the head position of a head mounted display, or through a position selection user interface when viewing on a normal 2D display.

BRIEF DESCRIPTION OF THE DRAWING FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity.

DETAILED DESCRIPTION

Because the viewer of a panoramic video playback system is only viewing a portion of the entire panoramic video, e.g. $\frac{1}{12}$th of the available area at a given time, the most interesting regions of the video may not be viewed. Existing methods of signaling a rectangular region of interest do not directly apply to the generation of a viewport from a spherical panoramic video or any other spherical or curved format video.

A supplemental enhancement information (SEI) message may be used which contains metadata to enable a panoramic video content creator to signal a suggested most interesting viewport to be displayed for a viewer. The suggested most interesting viewport may be indicated for a spherical representation of the panoramic video through metadata that signals the information needed to generate a viewport of the panoramic video. Using a spherical representation allows this signaling to be used for any of a variety of different planar projection formats including e.g. equi-rectangular, cube map, octahedral, truncated square pyramid, etc. It also allows the signaling to be used for any type of encoder and decoder.

At the client, the viewport generator can use the received metadata to generate the suggested rectilinear viewport to display for the viewer. This viewport offers an alternative to the one that would otherwise be selected based upon the viewer's head position or selected based upon another position indication user interface.

While a rectangular region of interest may easily be signaled in some systems, the rectangular region approach is not effective for spherical video coded in a projection format. A rectangular region of interest of a frame coded in a planar projection format does not correspond to the portion of the video frame used for generation of a viewport. The corresponding positions used in generating the viewport correspond to one or more non-rectangular regions, possibly discontinuous, in the coded video frame of the projection format.

Figure 1:
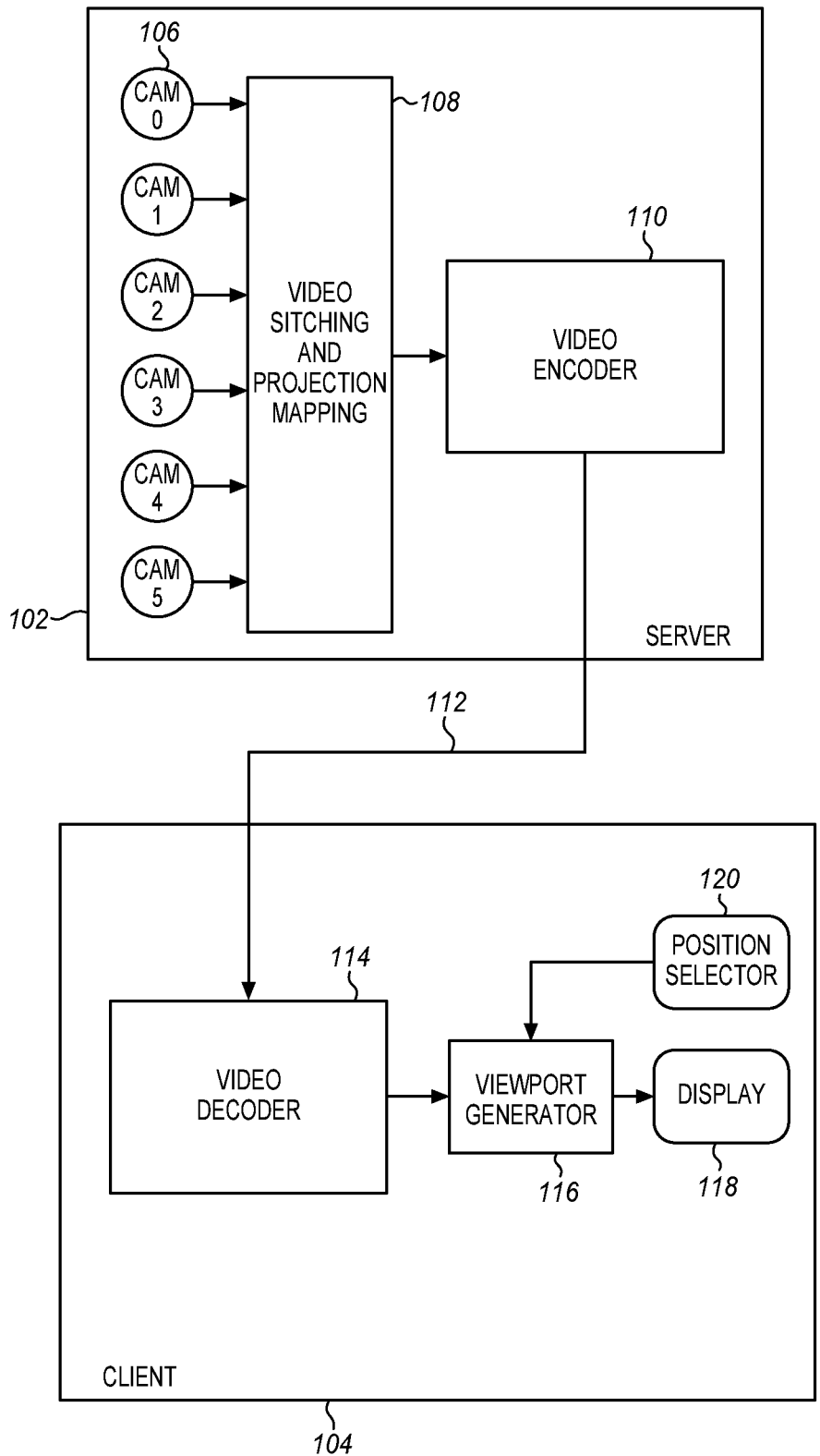
FIG. 1 is a block diagram of a panoramic video coding system according to an embodiment.

FIG. 1 is a block diagram of a panoramic video coding system. Video is produced at a server, production system or a combination of different systems 102. At the server, multiple cameras 106 capture 2D video. Six cameras are shown, but more or fewer may be used. The cameras are connected to a first module 108. At the first module, the multiple videos are stitched together and mapped to a projection format. The stitched video in the projection format is input to a video encoder 110, such as HEVC or AVC. The encoder encodes the video and sends or buffers it for later transmission as a bitstream. The decoder may have an internal buffer or mass storage or a suitable buffer or data store may be provided external to the encoder.

The encoded video is sent as a bitstream through a network, Internet, broadcast, or point-to-point connection 112, from a server or head end to one or more clients 104. At the client, a video decoder 114 receives the video from the server and decodes the compressed bitstream. When only a portion of the decoded video is viewed, a viewport is generated in a viewport module 116 for that selected region. The portion of decoded video to view is determined by a position selector 120 using, for example the head position of a head mounted display or a position selection user interface. The position is sent to the viewport generator that receives the decoded video and provides a suitable video stream to a display 118. The display allows the viewport to be viewed on a normal 2D display. There may be a buffer associate with or integrated into the viewport generator to save the video before or display.

Figure 2:
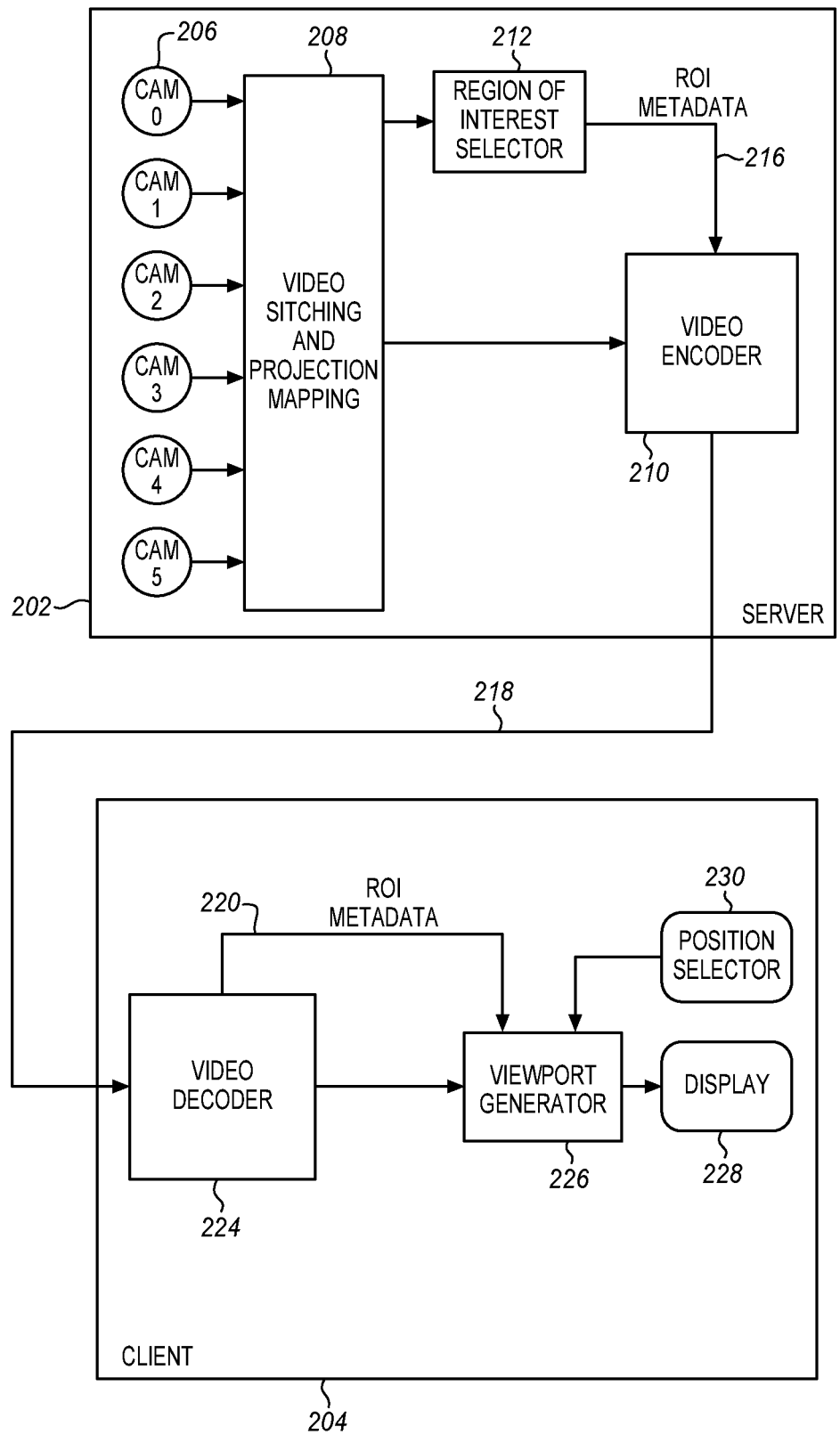
FIG. 2 is a block diagram of an alternative panoramic video coding system according to an embodiment.

FIG. 2 is a block diagram of an alternative panoramic video coding system. Video is produced at a server 202, production system or a combination of different systems. Multiple cameras 206 capture 2D video and provide it to the first stitching and projection module 208. The multiple videos buffered in a buffer within the module. The videos are stitched together at this module and mapped to a projection format. The stitched video in the projection format is stored in another buffer of the module and then input to a video encoder 210, such as HEVC or AVC.

The content creator, a commentator, editor, or any other actor may select a most interesting viewport region. Alternatively, an automated system may select a viewport region for example as an area with high motion rates or high texture features. The selection is applied to a region of interest (ROI) selector 212 that is coupled to the video encoder 210. The video encoder encodes the video received from the video stitching and mapping projection 208. The selected ROI is provided as information such as metadata 216 to the video encoder and is included in the video bitstream 218 by the encoder. The information may be encoded in any of a variety of different ways. The ROI may be provided in the form of metadata that is added to the video bitstream output of the encoder. It may be added in the form of an SEI message or in another form. The ROI metadata may be associated with a frame or a group of frames and therefore may be updated as often as once per frame.

One such way to encode the information is as metadata within the structure of a Supplemental Enhancement Information (SEI) message, however, any of a variety of other message structures may be used. There may be multiple ROI selections provided as multiple SEI messages from different editors or commentators. There may also be multiple ROI selections from a single editor to indicate more than one ROI. The user may then select from among any that cannot be displayed at the same time. The messages may conflict with one another or complement one another. Since SEI messages are associated with a particular frame, the viewport or ROI selection or suggestion may be changed with any frame.

The video encoder encodes the video, combines it with the SEI message and any other metadata and sends or buffers it for later transmission as a bitstream. The encoder may include a suitable buffer or another storage device may be incorporated into the encoder or another part of the server.

The encoded video is sent as a bitstream through a data link 218 such as a network, Internet, broadcast, or point-to-point link from the server 202 or head end to one or more clients 204. At the client, a video decoder 224 receives the video 218 from the server, decodes 224 the compressed bitstream 218 and extracts any SEI messages. A viewport generator module 226 receives the SEI messages with the selected ROI for the video and also a position from a user position selector 230. The viewport generator receives the decoded video and provides a suitable video stream to a display 228. This video stream may be immediately displayed or stored in a buffer or other storage that is in the viewport generator or connected to the viewport generator. At the client end, the viewer can select to follow the recommendation of the content provider to view the suggested viewport of the SEI message or the client can select a viewport using a position selection 230 or other sensors. In this way, the selected or recommended ROI can be overridden by the viewer.

The suggested viewport metadata is associated with a frame and therefore may be updated as often as once per frame. More than one suggested viewport can be indicated, if the content creator wishes to indicate more than one, for example to track multiple moving objects separately. This allows the viewer to select to watch, for example, a particular person or event within the panoramic view.

Figure 3:
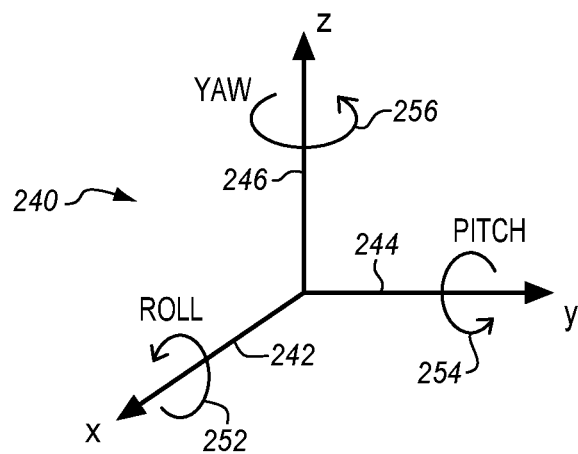
FIG. 3 is a diagram of a three-axis Cartesian coordinate system showing rotational directions for pitch, yaw, and roll.

The metadata representing a viewport position or a spherical rotation orientation may contain three or more parameters, such as longitude, latitude and field of view, pitch, yaw, and roll, or azimuth, elevation, and tilt. FIG. 3 is a diagram of a three-axis Cartesian coordinate system 240 showing rotational directions for pitch 254, yaw 256, and roll 151. The three axes are the x-axis 242, the y-axis 244, and the z-axis 246. The rotational directions are a clockwise rotation about each axis as seen from the origin of the frame of reference. Roll is around the x-axis. Pitch is around the y-axis, and yaw is around the z-axis. The axes may have different names, such as horizontal, vertical, or depth or any other suitable names. Azimuth, elevation and tilt correspond to angles between the origin and a ray from the origin to a position on a sphere around the origin. While the present embodiments are in the form of rotations around axes of a Cartesian coordinate frame of reference. The rotation of the spherical projection may be represented in any other desired way using other types of coordinate systems and projections.

This metadata may be included in a Supplemental Enhancement Information (SEI) message, as used in the HEVC and AVC standards. Using an SEI message allows legacy encoders and decoders to be used because the normative encoding and decoding process is unchanged. Rotation may be applied as a preliminary process 214 at the transmitter 202 and as a post process 222 at the receiver 204 or in other positions in the process, depending on the particular implementation. The post-process spherical rotation is applied to the decoder's output pictures.

As alternatives to SEI and metadata, the rotation orientation metadata may be included in a parameter set in a video codec, or in a slice header. In this case, the definition of conformant output pictures may be changed such that the inverse spherical rotation is already applied before a picture is output.

Table 1 is an example of a syntax for an SEI message with metadata parameters for ROI suggestion or selection syntax. This syntax may be used with existing video codec standards, such as HEVC and AVC, because it does not change the core encoding or decoding process. The metadata has flags to indicate whether the viewport supersedes prior viewports. It also provides a position on the sphere of the image and a horizontal and vertical field of view.

The metadata includes the information needed to generate a viewport, identified by an ID and a cancel flag. The information includes the position of the center of the viewport in the spherical representation, as represented by longitude and latitude, and the horizontal and vertical field of view sizes, in angles. The angles may be indicated in degrees, radians, or a linear distance. Although other types of representations may be used to indicate a position and a size of the ROI. Using a spherical representation as the basis allows the same syntax to be used for any projection format or layout, such as equi-rectangular projection, cube map projection, octahedral projection, icosahedral projection, truncated square pyramid projection, etc.

TABLE 1

|  | Descriptor |
|---|---|
| viewport_info_( payloadSize ) { |  |
|    viewport_info_id | ue(v) |
|    viewport_cancel_flag | u(1) |
|    if( !viewport_cancel_flag ) { |  |
|       viewport_cnt_minus1 | ue(v) |
|       for( i = 0; i <= viewport_cnt_minus1; i++ ) { |  |
|          viewport_longitude[ i ] | ue(v) |
|          viewport_latitude[ i ] | ue(v) |
|          viewport_fov_hor[ i ] | ue(v) |
|          viewport_fov_ver[ i ] | ue(v) |
|       } |  |
|       viewport_info_persistence_flag | u(1) |
|    } |  |
| } |  |

An ROI position may be sent in metadata for an entire coded video sequence, and/or per frame. The signaled values, i.e. latitude, longitude, and field of view parameters in the metadata, indicate a viewport to be applied to the output images following the decoder.

Table 2 provides and alternative omnidirectional viewport SEI message syntax.

In some embodiments, the omnidirectional viewport SEI message specifies the coordinates of one or more regions of spherical-coordinate geometry, bounded by four great circles, corresponding to viewports recommended for display when the user does not have control of the viewing orientation or has released control of the viewing orientation to the viewport recommendations.

omni_viewport_id contains an identifying number that may be used to identify the one or more recommended viewport regions.

omni_viewport_cancel_flag equal to 1 indicates that the SEI message cancels the persistence of any previous omnidirectional viewport SEI message in output order. omni_viewport_cancel_flag equal to 0 indicates that omnidirectional viewport information follows. This may be used so that a viewport SEI is used only when there is a change in the viewport.

omni_viewport_persistence_flag specifies the persistence of the omnidirectional viewport SEI message for the current layer. omni_viewport_persistence_flag equal to 0 specifies that the omnidirectional viewport SEI message applies to the current decoded picture only.

omni_viewport_persistence_flag equal to 1 specifies that the omnidirectional viewport SEI message persists for the current layer in output order until one or more of the following conditions are true. Let picA be the current picture:

A new CLVS of the current layer begins.

The bitstream ends.

A picture picB in the current layer in an access unit containing an omnidirectional viewport SEI message that is applicable to the current layer is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for picture order count for picB.

When an equirectangular projection SEI message with erp_cancel_flag equal to 0 or a cubemap projection SEI message with cmp_cancel_flag equal to 0 is not present in the CLVS that applies to the current picture and precedes the omnidirectional viewport SEI message in decoding order, an omnidirectional viewport SEI message with omni_viewport_cancel_flag equal to 0 shall not be present in the CLVS that applies to the current picture. Decoders shall ignore omnidirectional viewport SEI messages with omni_viewport_cancel_flag equal to 0 that do not follow, in decoding order, an equirectangular projection SEI message with erp_

TABLE 2

|  | Descriptor |
|---|---|
| omni_viewport( payloadSize ) { |  |
|    omni_viewport_id | u(10) |
|    omni_viewport_cancel_flag | u(1) |
|    if( !omni_viewport_cancel_flag ) { |  |
|       omni_viewport_persistence_flag | u(1) |
|       omni_viewport_cnt_minus1 | u(4) |
|       for( i = 0; i <= omni_viewport_cnt_minus1; i++ ) { |  |
|          omni_viewport_azimuth_centre[ i ] | i(32) |
|          omni_viewport_elevation_centre[ i ] | i(32) |
|          omni_viewport_tilt_centre[ i ] | i(32) |
|          omni_viewport_hor_range[ i ] | u(32) |
|          omni_viewport_ver_range[ i ] | u(32) |
|       } |  |
|    } |  |
| } |  | cancel_flag equal to 0 or a cubemap projection SEI message with cmp_cancel_flag equal to 0 in the CLVS that applies to the current picture.

omni_viewport_cnt_minus1 plus 1 specifies the number of recommended viewport regions that are indicated by the SEI message. When omni_viewport_cnt_minus1 is greater than 0 and there is no information on which recommended viewport is suggested to be displayed, the following applies:

When omni_viewport_id is equal to 0 or 1, the 0-th recommended viewport is suggested to be displayed when the user does not have control of the viewing orientation or has released control of the viewing orientation.

omni_viewport_azimuth_centre[i] and omni_viewport_elevation_centre[i] indicate the centre of the i-th recommended viewport region, in units of $2^{-16}$ degrees, radians, or any other desired units relative to the global coordinate axes.

omni_viewport_tilt_centre[i] indicates the tilt angle of the i-th recommended viewport region, in units of $2^{-16}$ degrees. omni_viewport_hor_range[i] indicates the azimuth range of the i-th recommended viewport region. omni_viewport_ver_ range[i] indicates the elevation range of the i-th recommended viewport region.

The specific definitions of each of these parameters, the units, and the ranges of values may be modified to suit any other particular implementation. Similarly, any one or more of the parameters may be deleted or replaced with a different parameter to suit other implementations. Additional parameters may be added and the order of the parameters may be modified to suit different implementations.

Figure 4:
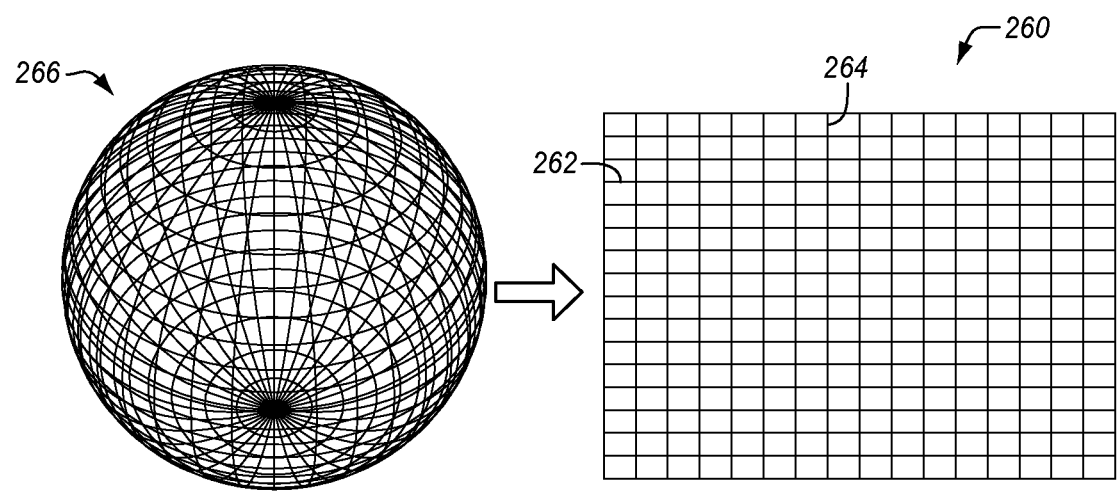
FIG. 4 is a diagram of an equi-rectangular format projection from a sphere to a planar surface.

FIG. 4 is a diagram of an equi-rectangular format projection. The original spherical view 266 is shown on the left and the projection of the sphere onto an unwrapped planar grid 260 is shown on the right. Discontinuities are introduced at the left 262 and right 264 edges of the rectangular planar frame 260 on the right. With the real-world spherical representation on the left, the left and right edges connect. In addition, significant warping distorts pixels along the top and bottom of the frame on the right. This corresponds to the north pole and south pole regions on the left. A particular suggested viewport might cross the left and right edges of the equi-rectangular format, and hence would correspond to two different regions in the coded projection format frame. Similarly, a particular suggested viewport might cross through different parts of the top edge and be distorted.

Current video coding standards which use spatial directional intra-prediction and block translational motion compensation will perform better near the center of the equi-rectangular prediction than near the poles, or along the left and right edges. An object which stretches across the left/right edge discontinuity would not be well predicted using spatial intra-direction position or with motion compensation.

Figures 5, 6, 7:
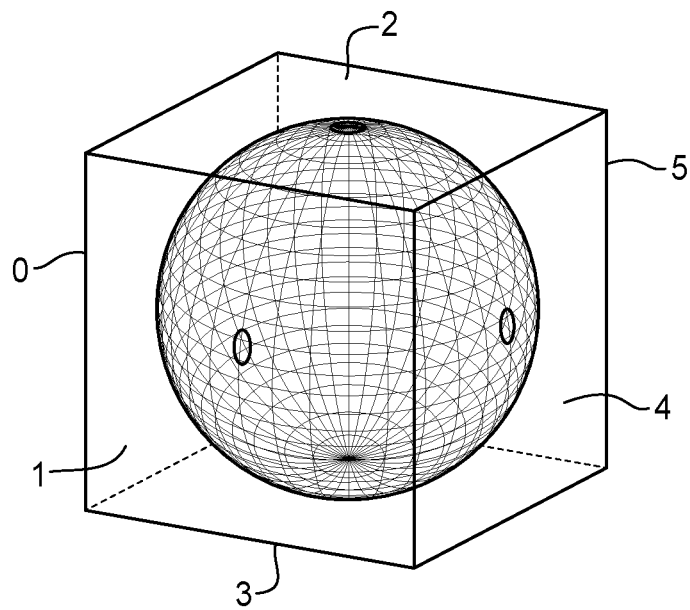
FIG. 5 is a diagram of a cube map projection in which a sphere is projected onto six planar faces labeled 0 to 5.
FIG. 6 is a diagram of a 4×3 planar grid with the six faces of a cube map projection.
FIG. 7 is a diagram of a 2×3 planar grid with the six faces of a cube map projection rearranged for compactness.

In the cube map projection, six cube faces are arranged into a rectangular frame. FIG. 5 is a diagram of a cube map projection in which a sphere is projected onto six planar faces labeled 0 to 5. Each of the 6 faces is projected onto a part of the sphere. The faces may then be represented on a planar grid. FIG. 6 illustrates a 4×3 planar layout of the six faces in which adjacent areas of the projection are placed next to each other. As shown, the boundaries between faces 1 and 2, 1 and 3, 1 and 4, 4 and 0 and 0 and 5 are maintained adjacent. However, no other boundaries are placed adjacent to each other as they are in FIG. 6. The 2 and 3 faces may be moved to be on either side of face 4, 5, or 0 to maintain those boundaries instead. While the planar grid representation is well suited for many codecs and other digital processing and compression systems, there are some areas of the planar frame of FIG. 6 that do not contain pixels representing the cube. These are the areas above and below faces 4, 5, and 0. These faces may be set to a background color but require some data to encode. FIG. 7 illustrates a 3×2 planar layout, where the cube faces have been rearranged to fit into a more compact layout. The FIG. 7 representation may require some additional complexity in processing edges but the number of pixels is reduced by one half from 4×3 to 3×2.

The selection of a rotation orientation for encoding of a cube map projection format will depend upon the particular layout selected, as the projection formats differ in the number and positions of discontinuities. The edge regions of each cube face have more distortion than the center region of the cube face. The selection of the rotation orientation should particularly attempt to minimize objects straddling across discontinuities in cube face edges. Other projection formats which contain faces with edges also introduce similar discontinuities and distortions.

Figure 8:
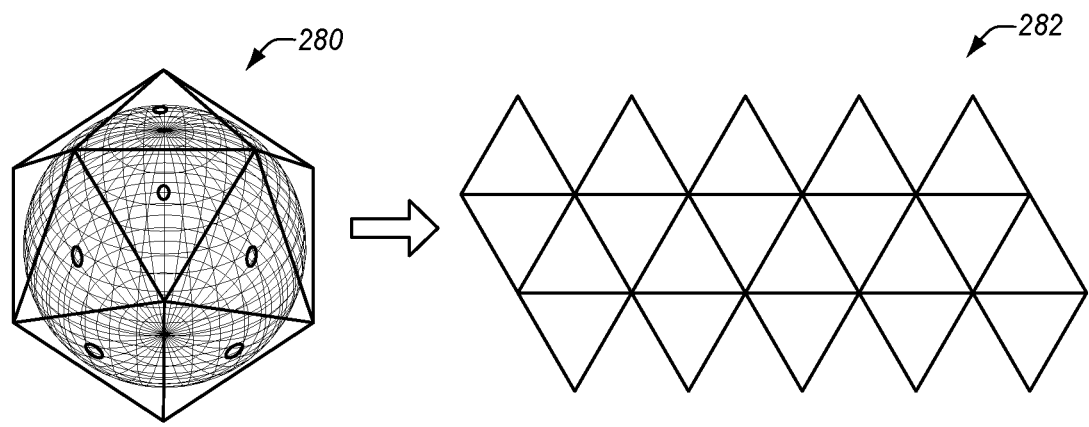
FIG. 8 is a diagram of an icosahedral format projection from a sphere to a planar surface.

FIG. 8 is a diagram of an icosahedral projection. This is another type of projection from a spherical representation to a planar representation using an icosahedron. In this example, the left side shows a sphere 280 projected onto the 20 facets of a surrounding icosahedron, rather than the only six facets of the cube map of FIG. 5. The 20 facets are then shown as laid out on a two-dimensional space 282 on the right. As with the other projections, there are distortions and inconsistencies at the edges of each of the facets. Using more facets reduces the amount of distortion but increases the numbers and positions of the seams.

Any of a variety of other projections may also be used as mentioned above including octahedral, truncated square pyramid, and any of a variety of other types of polygonal projections. With more facets, the distortion of each facet is reduced, but complexity may be increased and it may be more difficult to avoid the edges.

In some embodiments, the recommended viewport can be selected as part of the encoding process. In some embodiments, the recommended viewport can be selected through an "a posterion" process by analyzing a scene for motion or other characteristics and determining which portion of the scene contains the features of greatest interest. In some embodiments, hierarchical methods can be used with the approach, such that a down sampled version of the frame is encoded rather than the full resolution frame.

An alternative approach is to detect areas of high motion and/or high texture in the panoramic frame, and aim to center those areas in the equi-rectangular frame, or in a cube face, depending on the projection format being used.

The SEI message as described above may be used in combination with a spherical selected viewport SEI message. When the two SEI messages are used together, the rotation suggested by the spherical rotation information orientation SEI message may be applied first, and then the suggested viewport location from the suggested viewport SEI message determined with respect to the rotated spherical representation.

If frame packed stereo video is contained within the video frame, either orientation values may be sent separately for each view, or values for the second view may be derived based on the first view's value, possibly considering any information about the relative position of the second view to the first view.

Figure 9:
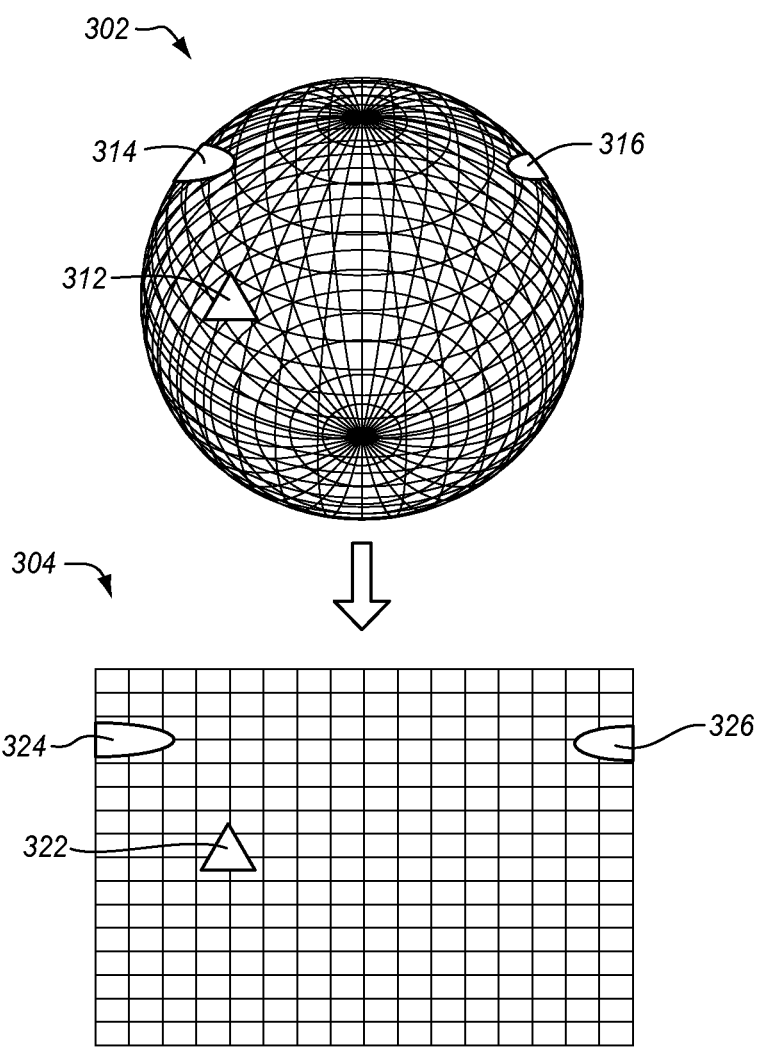
FIG. 9 is a diagram of an equi-rectangular format projection of two objects from a sphere to a planar surface without rotation according to embodiments.

FIG. 9 is a diagram of a sphere 302 that has a panorama multiple camera view and an equi-rectangular projection of the sphere onto a planar surface 304. In this example, video content is represented as an oval 314, 316 and a triangle 312 in the sphere. The two portions of the oval 314, 316 represent the same oval as seen on two side of the panorama view. These objects are projected into the equi-rectangular mapping 304 and show up as two parts of the same oval 324, 326 and the triangle 322. In the equi-rectangular mapping, the oval has a discontinuity 324, 326 across the left and right edges. It is also stretched horizontally because it is close to the north pole.

Figure 10:
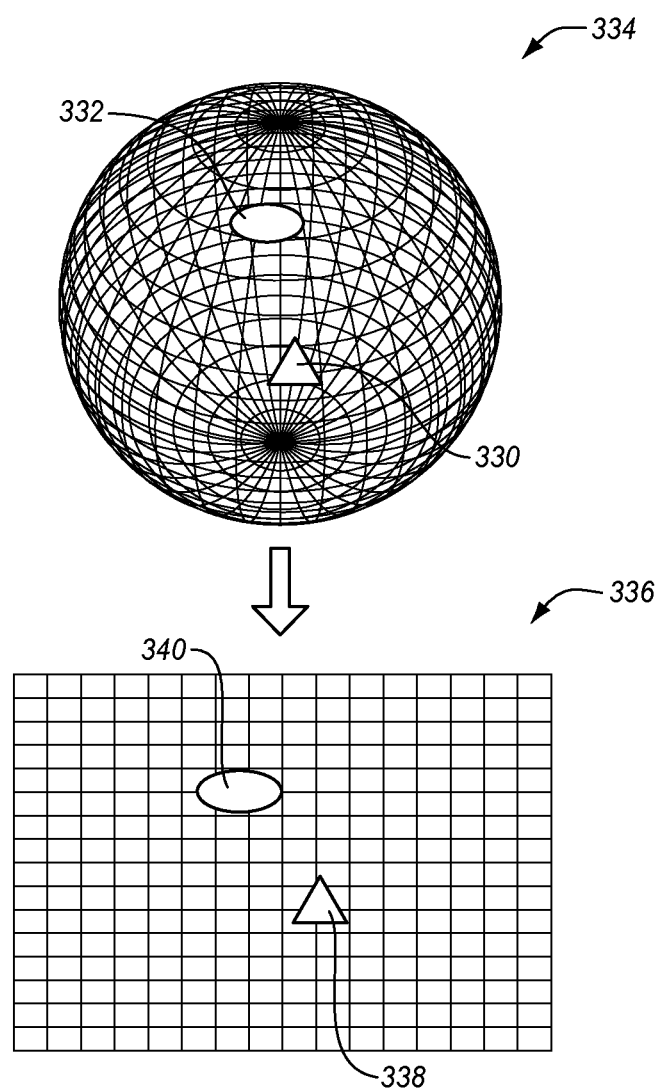
FIG. 10 is a diagram of an equi-rectangular format projection of two objects from a sphere to a planar surface with rotation according to embodiments.

FIG. 10 is a diagram of the sphere 334 and the rectangular mapping 336 of the same content after spherical rotation has been applied to the sphere. The oval 332 of the rotated sphere is now closer to the center of the frame. The triangle 330 is as close to the center as the oval, so the distortion of the two items will be about the same. In an equi-rectangular projection every two-dimensional object is distorted. The amount of distortion increases with distance from the center. As shown with the rotated sphere 334 as compared to the same sphere 302 without the rotation, there is no longer a discontinuity in the oval. Since the oval is closer to the center of the frame, there is also less distortion. The triangle is also improved but not as significantly. The planar grid 336 of the projection make it clearer that the projected oval 340 and the projected triangle 338 are close to the middle of the grid where distortion is less and the oval is not in one part instead of two as with the projection 304 before rotation. A video that is encoded based on the rotated of frame should code more efficiently by a legacy video encoder than a video using the frames that are not rotated.

Any of a variety of other projections may also be used as mentioned above including octahedral, truncated square pyramid, and any of a variety of other types of polygonal projections. With more facets, the distortion of each facet is reduced, but complexity may be increased and it may be more difficult to avoid the edges. A selected viewport may nevertheless be indicated using latitude, longitude, or other coordinates.

Returning to FIG. 2, the unique structure and configuration improves a user's experience for panoramic video, 360° video, VR video systems and any other wide field of view system that uses a projection. The operation of the structure may be better understood in light of the description of spherical to rectangular mapping above.

Figure 11:
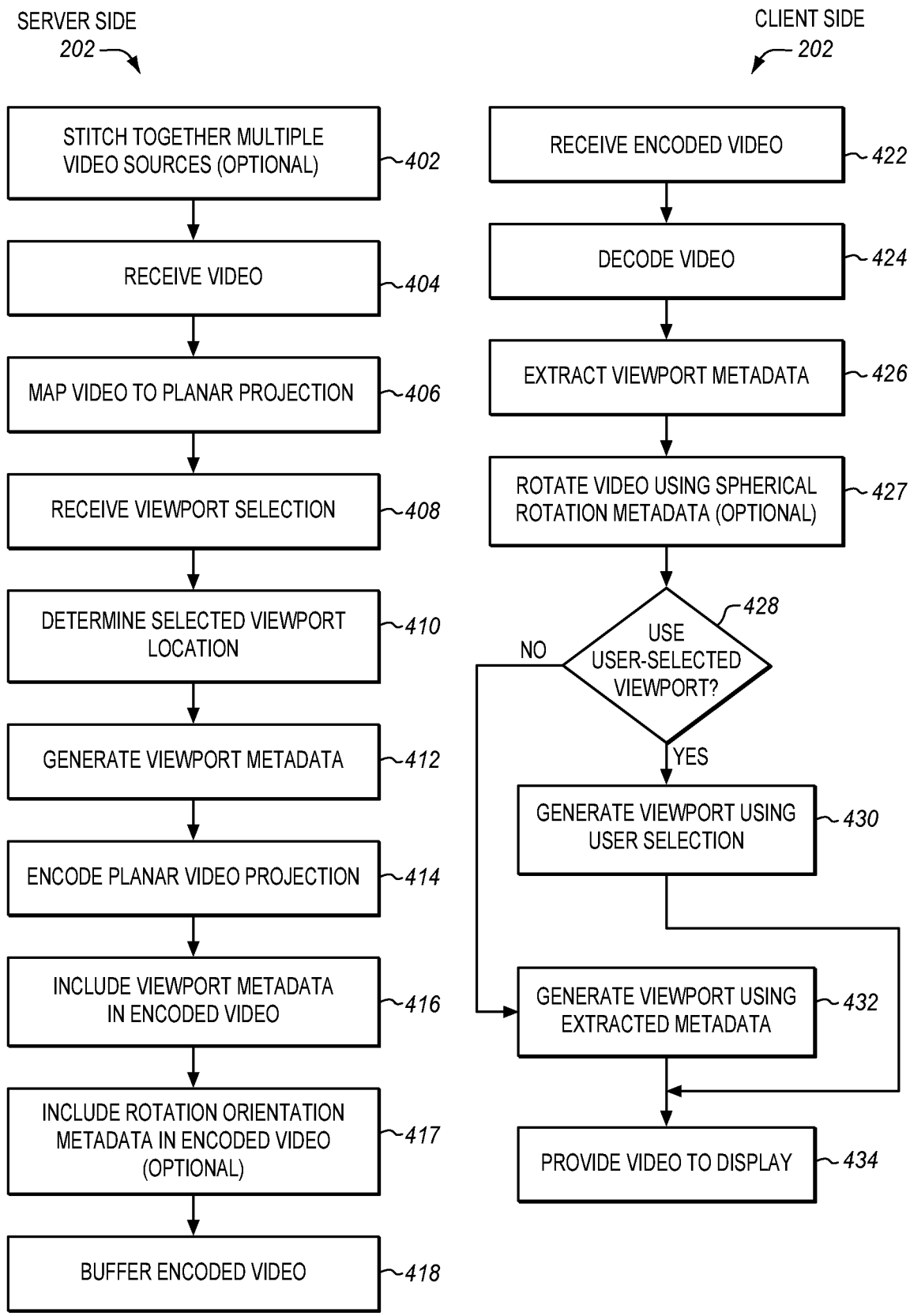
FIG. 11 is a process flow diagram of suggesting a viewport indication for a wide field of view video for encoding and viewing according to embodiments.

FIG. 11 is a process flow diagram of using a preferred viewport and sending a viewport indication as described above. On the server or sender side 202, the projection mapping receives a wide field of view video at 404. In the figure, the video is received from multiple cameras and so the mapping module or another video stitcher stitches the video from the multiple cameras together at 402 to produce a single wide field of view video. In other cases, the video may be previously stored and then retrieved for encoding or some or all of the video may be generated by a graphics system based on software and user input. The video input may include a simulated or virtual world or there may be virtual and real parts combined together. The video may be 180°, 360°, panoramic, or any other wide field of view. The video may have a wider horizontal field of view than a vertical field of view.

The complete stitched-together wide field of view video however generated or received is then mapped into a planar projection at 406. Any of a variety of different projections may be used. Equi-rectangular projection, spherical cube projection, and icosahedral projection are shown and described but there may be other projections as well.

In the examples shown herein, the video is spherical, however a complete sphere is not required. The video may contain only a portion of a sphere. The 180° field of view mentioned above is only half of a sphere. The field of view may be reduced both horizontally and vertically to show only a portion of a sphere. On the other hand, the field of view is curved in the manner of a portion of a sphere. This allows the image to be the same distance from a viewer in all directions.

This curved image is then projected onto a planar surface using any desired type of geometry including the examples shown above. While the curved field of view, being all or part of a portion of a sphere, has no inherent distortions, a planar projection of such a curved surface does have distortions. The planar projection, however, is well suited to encoding, compression, and other image processes.

Before or after the video is mapped, a suitable viewport selection is received for the scene at 408. The selection is made in some embodiments so that important areas or regions of interests are in the view port. In some embodiments, the scene is analyzed to select a viewport. Alternatively, the viewport selection is from a producer or creator or is based on viewer statistics. In some embodiments, such as with virtual reality, a viewport is also received from the user. This may provide an option for a user that does not want to use the viewport selected at the server end. The viewport indicates which part of the wide field of view video will be in the user's field of view and therefore in the middle of the user's field of view. This area or region may have a speaker, a character, a newly appearing object or some other characteristic that makes it more important than other areas. This area or region may then be selected as the most important, corresponding to a recommended or selected viewport.

The received or generated viewport is then compared to the video to determine its location in the video at 412. The position may be identified as latitude and longitude on the spherical projection or as a position on the planar projection. The planar projection position may be indicated as Cartesian coordinates or in some other way. In addition, the size of the viewport may be indicated. In the example of Tables 1 and 2, the size is indicated as a horizontal and vertical field of view, however, other units may be used, including a number of pixels or an angular or linear distance in the horizontal and vertical directions.

The size of the viewport may be used to create a zooming effect in which the user's view is made wider or narrower depending on the size of the viewport. In another embodiment, the user's view remains the same size so that a larger field of view for the viewport may fill the user's entire field of view. A smaller field of view for the viewport may fill only a part of the user's field of view. The smaller field of view may allow the user to move the viewport to different positions to see elements beside the recommended viewport.

A position on a spherical video may be expressed in many different ways. In spherical coordinates, roll, pitch, and yaw may alternatively be used to express position on the sphere. One or more of these may be used or Cartesian coordinates, e.g. vertical and horizontal may be used with reference to the projection. For roll, pitch, and yaw, it is not required that all three be used. Only one may be required to move the region of interest away from the poles. A second coordinate may be used to indicate distance from the left and right seam edges. The rotation information for roll, pitch, and yaw may be expressed as an angle. The angle of rotation will be relative to the original orientation of the video. In addition, the absolute orientation of the video may be included in the metadata. The absolute orientation reflects an orientation of a camera or of one or more of the multiple cameras when there is a camera array.

After the viewport is determined then the region of interest selector 212 generates viewport metadata describing the selected viewport at 412. This is provided to the video encoder so that when the video encoder encodes the planar projection of the spherical video at 414, the viewport metadata is included in the encoded video at 416. Rotation orientation metadata may also be included at 417. The encoded video with the metadata is then transmitted, buffered, or stored so that it can be provided as encoded video for immediate or later transmission and display. For many types of encoding, such as HEVC and AVC, an SEI message may be used, although the invention is not so limited.

The selection of a viewport may be made for each frame of the video or for each frame in which the region of interest moves. SEI messages are tied to a particular frame so that each frame at which the region of interest has moved may have its own viewport message. In some cases, the message may be to cancel a viewport selection for the next set of frames until a new viewport message is received. This may be done using the flags shown and described above in Tables 1 and 2. This allows each scene and region of interest change to be flagged with a different SEI message to change the viewport for the corresponding frame.

At the receiver or client side 204, the encoded video, including the metadata, such as an SEI message, is received from the server or broadcaster at 422. The client has a decoder to decode the video at 424 and to extract the viewport metadata at 426. A viewport may then be generated for the decoded video based on the viewport metadata. If rotation orientation metadata is also included in the metadata, then a rotation may be performed at 427 that is determined by a pitch, roll, and yaw angle or in some other way as indicated in the message. This is rotation of the spherical video to reverse rotation that wash applied at the cameras or the encoder. This viewport of the video is then provided to a display, such as a headset, 3D monitor, or 2D display screen for viewing by the user.

For many applications, there will be a viewport selected by the user through a position selector 230 of a user interface. This may be done through a conventional user input device or through some other sensor. For a VR headset, the movement of the headset or user's eyes may be detected and the viewport determined based on where the user is looking. A viewport generator 226 may then generate a view of the decoded video using either the recommended viewport from the metadata, the user's selected viewport of a combination of the two.

At 428 it is determined whether to use the user selected viewport, such as the one received from the position selector. The decision may be based on a user input or the lack of a user input. There may be a default to use the user-selected input only if the user has made a selection and if the user has indicated that the user selection overrides any other viewport. If the user-selected viewport is not to be used then at 432, a viewport is generated using the extracted metadata. As mentioned, in some cases, there may be more than one viewport selection received in the metadata. In such a case, there will be a default, such as the director's cut and the user may be allowed to select a different viewport from among the other viewports contained in the metadata.

If the user's selection is to be used, then at 430 the viewport generator generates a viewport using the user selection. The generated viewport in either case is provided as a video for display at 434.

As mentioned above, the received encoded video is a projection of a wide field of view received from multiple cameras or generated by a graphics system. The projection may be an equi-rectangular projection or any other suitable planar projection. Many video encoding systems allow metadata, such as SEI messages, to be associated with a particular frame of the encoded video. As a result, when the decoder finds a new SEI viewport message, the viewport generator may be commanded to change the viewport for the corresponding frame using the new message. The viewport may then be maintained until the next message comes. As a result, additional metadata can be received for additional frames of the encoded video.

Figure 12:
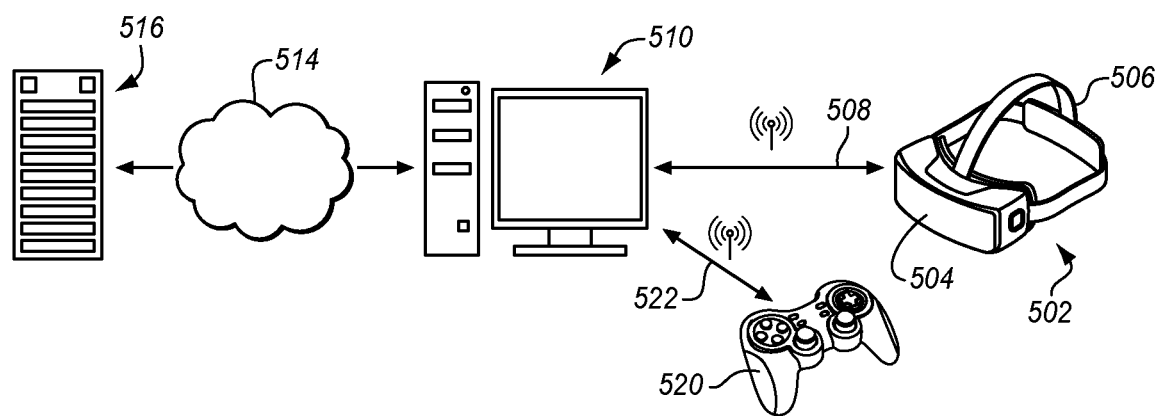
FIG. 12 is a block diagram of a head mounted display with connected computing resources suitable for embodiments.

FIG. 12 is a diagram of high performance HMD (Head Mounted Display) with multiple remote information sources. An HMD 502 has a main body 504 and an attachment strap 506. The main body carries user displays and speakers to render the virtual world to the wearer. The main body also has inertial sensors, a microphone and other user input devices. A processing, communications, and power or battery suite allow the HMD to render video and sound and to communicate wirelessly 508 with a tethered computer 510.

The user interacts with the virtual world through head and body movements and may also interact using voice commands, hand gestures and other user input devices. A game controller 520 may be coupled to the tethered computer through the same 508 or another 522 wireless interface to provide additional controls. The HMD may be coupled to the computer through a WiFi, WiDi, or other high speed digital wireless connections to receive rendered or compressed video frames and audio from the computer for display to the user. Additional descriptions, data, parameters, and commands may also be received from the computer. The HMD may also send command, control, and virtual interaction data to the computer through the same or another wireless link. The controller, for example may communicate through Bluetooth or unlicensed bands. Multiple wireless interfaces may be combined to provide the complete user experience.

In some cases, the computer is portable and carried by the user. This allows for a wired connection, if desired. The carried computer may have a notebook, tablet, smartphone, or any other desired physical configuration. In other cases, the computer is fixed and is attached to the HMD using a wired connection.

The computer may in turn be connected through the Internet, a LAN (Local Area Network) or other connection 514, wired or wireless, to a remote server 516. The remote server provides encoded video and may provide additional information about the virtual world. The remote server may also provide communication with other users that are experiencing the same or a related virtual world. Alternatively, the HMD may communicate directly with the server without going through the computer 510. In other embodiments, no remote server is used and the tethered computer operates independently.

In the examples herein, a wireless HMD has a local computing resource or client device, such as a CPU (Central Processing Unit) that may be coupled to a GPU (Graphics Processing Unit), graphics processor, memory and other resources to allow the HMD to store and render received encoded video. The local rendering may include rotation and viewport generating as described, among other tasks.

Figure 13:
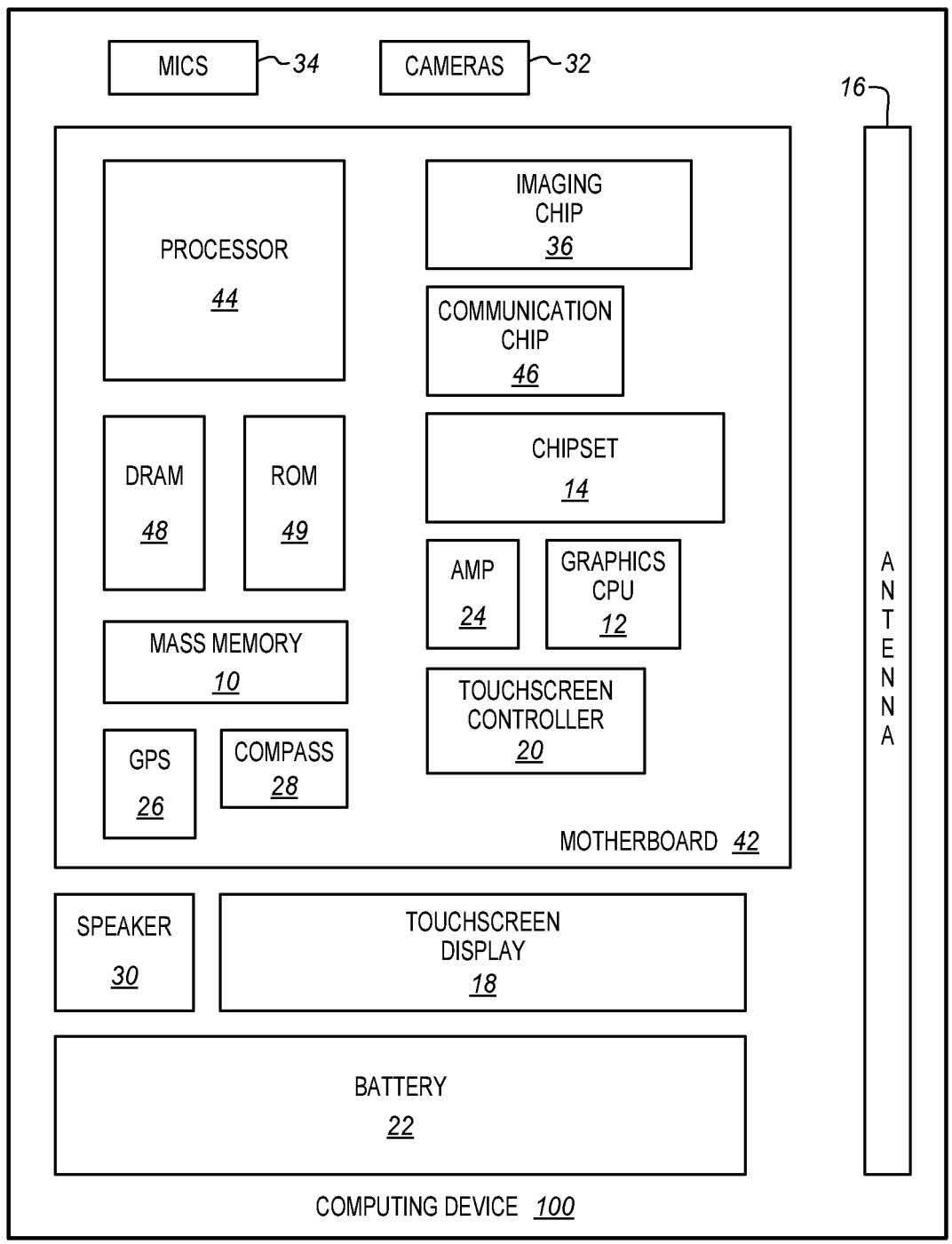
FIG. 13 is a block diagram of a computing device suitable for video capture, encoding, decoding, and display according to an embodiment.

FIG. 13 illustrates a computing device 100 in accordance with one implementation. The computing device 100 houses a system board 42. The board 42 may include a number of components, including but not limited to a processor 44 and at least one communication package 46. The communication package is coupled to one or more antennas 16. The processor 44 is physically and electrically coupled to the board 42.

Depending on its applications, computing device 100 may include other components that may or may not be physically and electrically coupled to the board 42. These other components include, but are not limited to, volatile memory (e.g., DRAM) 48, non-volatile memory (e.g., ROM) 49, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera array 32, a microphone array 34, and a mass storage device (such as hard disk drive) 10, compact disk (CD) (not shown), digital versatile disk (DVD) (not shown), and so forth). These components may be connected to the system board 42, mounted to the system board, or combined with any of the other components.

The camera array may be coupled to an image chip 36 and to the processor 44, either directly or through the image chip. The image chip may take a variety of different forms, such as a graphics co-processor, a digital signal processor (DSP), an image signal processor (ISP), or any other type of separate dedicated imaging management module. Such a device or module may comprise logic, algorithms, and/or instructions operative to capture, process, edit, compress, store, print, and/or display one or more images. In some embodiments, the imaging management module may comprise programming routines, functions, and/or processes implemented as software within an imaging application or operating system. In various other embodiments, the image processing may be implemented as a standalone chip or integrated circuit, or as circuitry comprised within the processor, within a graphics chip or other integrated circuit or chip, or within a camera module. The techniques described above may be implemented in the image chip of the processor or functions may be distributed between different components which may include the cameras, image chip, processor, and other components.

The communication package 46 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

In various implementations, the computing device 100 may be a laptop, a netbook, a notebook, an ultrabook, a smartphone, a wearable device, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. The computing device may be fixed, portable, or wearable. In further implementations, the computing device 100 may be any other electronic device that processes data.

The camera array 32 may be of the type described in reference to FIGS. 1 and 2 or another suitable configuration. The camera array may be incorporated into the same housing as the rest of the computing device 100 or it may be a separate peripheral device attached through a suitable wired or wireless connector. The computing device may be used a server device, editing device, or client device in a fixed or portable configuration.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims. The various features of the different embodiments may be variously combined with some features included and others excluded to suit a variety of different applications.

Some embodiments pertain to a method that includes receiving encoded video including viewport metadata, decoding the video, extracting the viewport metadata, generating a viewport of the decoded video based on the viewport metadata, and buffering the generated viewport for display.

In further embodiments the viewport metadata includes a center of the region of interest.

In further embodiments the center is indicated as a latitude and longitude of a viewport representation.

In further embodiments the viewport metadata includes a field of view of the region interest based on distance from the center.

In further embodiments the field of view is indicated as a horizontal angle and a vertical angle.

In further embodiments the viewport metadata is encoded as a Supplemental Enhancement Information message.

In further embodiments the received encoded video is a planar projection of a wide field of view.

In further embodiments the planar projection is an equi-rectangular projection and the wide field of view is panoramic.

In further embodiments the viewport metadata is associated with a frame of the received encoded video, the method comprising receiving additional viewport metadata for additional frames of the encoded video.

Further embodiments include determining whether a user has indicated using a user-selected viewport and if so, then generating a viewport using the user-selected viewport instead of generating a viewport using the viewport metadata.

In further embodiments the viewport metadata includes multiple viewports, the method further comprising selecting one of the multiple viewports and wherein generating a viewport comprises generating a viewport using the selected one of the multiple viewports.

In further embodiments selecting one of the multiple viewports comprises receiving a user selection of one of the multiple viewports.

In further embodiments the sizes of the multiple viewports are used to create a zooming effect.

In further embodiments the viewport metadata is associated with a frame of the received encoded video, the method comprising receiving additional viewport metadata for additional frames of the encoded video.

In further embodiments the encoded video further includes rotation orientation metadata, and the method includes extracting the rotation orientation metadata, and rotating the decoded video based on the rotation orientation metadata, wherein generating a viewport comprises generating a viewport using the rotated decoded video.

Further embodiments pertain to a machine-readable medium having instructions stored thereon that when executed cause the machine to perform operations that include receiving encoded video including viewport metadata, decoding the video, extracting the viewport metadata, generating a viewport of the decoded video based on the viewport metadata, and buffering the generated viewport for display.

Further embodiments pertain to an apparatus that includes a video decoder to receive a wide field of view video including viewport metadata and to extract the viewport metadata, and a viewport generator to generate a viewport of the decoded video based on the viewport metadata to buffer the generated viewport for display.

Further embodiments pertain to a method that includes receiving a wide field of view video mapping the video into a planar projection, receiving a selected region of interest in the video, generating viewport metadata describing the selected region of interest, encoding the planar projection as encoded video including the viewport metadata, and storing the encoded video.

In further embodiments the viewport metadata includes a center of the region of interest.

In further embodiments the center is indicated as a latitude and longitude of a viewport representation.

In further embodiments the viewport metadata includes a field of view of the region interest based on distance from the center.

In further embodiments the field of view is indicated as a horizontal angle and a vertical angle.

In further embodiments the viewport metadata is encoded as a Supplemental Enhancement Information message.

In further embodiments the received wide field of view video is received from multiple cameras, the method further comprising stitching the video from multiple cameras together to produce a single wide field of view video.

In further embodiments mapping the video comprises mapping the video to an equi-rectangular projection and wherein the wide field of view is panoramic.

Further embodiments include selecting a rotation of the projection, generating rotation orientation metadata describing the selected rotation, and rotating the projection based on the selected rotation, wherein encoding the planar projection comprises encoding after rotating the projection and including the rotation orientation metadata in the encoded video.

Some embodiments pertain to a machine-readable medium having instructions stored thereon that when executed cause the machine to perform operations that include receiving a wide field of view video, mapping the video into a planar projection, receiving a selected region of interest in the video, generating viewport metadata describing the selected region of interest, encoding the planar projection as encoded video including the viewport metadata, and storing the encoded video.

Further embodiments include selecting the selected region of interest by analyzing a scene of the video for motion and determining which part of the scene contains the fastest motion.

Some embodiments pertain to an apparatus that includes a buffer to receive a wide field of view video, a projection mapping module to map the video into a planar projection, a region of interest selector to receive a selected region of interest in the video and to generate viewport metadata describing the selected region of interest, and an encoder to encode the planar projection as encoded video including the viewport metadata and to store the encoded video.

In further embodiments the region of interest selector further analyzes the video to select the selected region of interest as having features with the highest complexity.

The invention claimed is:

1. A method comprising:
   receiving encoded video including viewport metadata;
   decoding the video;
   extracting the viewport metadata;
   generating a viewport of the decoded video based on the viewport metadata; and
   buffering the generated viewport for display,
   wherein the viewport metadata includes multiple alternative viewports, the method further comprising selecting one of the multiple viewports and wherein generating a viewport comprises generating a viewport using the selected one of the multiple viewports.

2. The method of claim 1, wherein the viewport metadata includes a center of the region of interest.

3. The method of claim 2, wherein the center is indicated as a latitude and longitude of a viewport representation.

4. The method of claim 2, wherein the viewport metadata includes a field of view of the region of interest based on distance from the center.

5. The method of claim 4, wherein the field of view is indicated as a horizontal angle and a vertical angle.

6. The method of claim 1, wherein the viewport metadata is encoded as a Supplemental Enhancement Information message.

7. The method of claim 1, wherein the received encoded video is a planar projection of a wide field of view.

8. The method of claim 7, wherein the planar projection is an equi-rectangular projection and the wide field of view is panoramic.

9. The method of claim 1, wherein the viewport metadata is associated with a frame of the received encoded video, the method comprising receiving additional viewport metadata for additional frames of the encoded video.

10. The method of claim 1, further comprising determining whether a user has indicated using a user-selected viewport and if so, then generating a viewport using the user-selected viewport instead of generating a viewport using the viewport metadata.

11. The method of claim 1, wherein selecting one of the multiple viewports comprises receiving a user selection of one of the multiple viewports.

12. The method of claim 11, wherein the sizes of the multiple viewports are used to create a zooming effect.

13. The method of claim 1, wherein the viewport metadata is associated with a frame of the received encoded video, the method comprising receiving additional viewport metadata for additional frames of the encoded video.

14. The method of claim 1, wherein the encoded video further includes rotation orientation metadata, the method further comprising:
   extracting the rotation orientation metadata; and
   rotating the decoded video based on the rotation orientation metadata,
   wherein generating a viewport comprises generating a viewport using the rotated decoded video.

15. A non-transitory machine-readable medium having instructions stored thereon that when executed cause the machine to perform operations comprising:

receiving encoded video including viewport metadata comprising multiple alternative viewports;

decoding the video;

extracting the viewport metadata;

selecting one of the multiple viewports;

generating a viewport of the decoded video based on the viewport metadata comprising using the selected one of the multiple viewports; and buffering the generated viewport for display.

16. An apparatus comprising:

a video decoder to receive a wide field of view video including viewport metadata including multiple alternative viewports and to extract the viewport metadata; and a viewport generator to generate a viewport of the decoded video comprising generating a viewport using a selected one of the multiple viewports to buffer the generated selected viewport for display.

17. A method comprising:

receiving a wide field of view video;

mapping the video into a planar projection;

receiving a selected region of interest in the video;

generating viewport metadata describing the selected region of interest and comprising multiple alternative viewports so that a selected one of the multiple viewports can be used to generate a viewport after decoding of the viewport metadata;

encoding the planar projection as encoded video including the viewport metadata; and buffering the encoded video.

18. The method of claim 17, wherein the viewport metadata includes a center of the region of interest indicated as a latitude and longitude of a viewport representation and a field of view of the region interest based on distance from the center indicated as a horizontal angle and a vertical angle.

19. The method of claim 17, further comprising selecting the selected region of interest by analyzing the video for motion and determining which part of the scene contains the fastest motion.

* * * * *